United States Patent
Gahleitner et al.

(10) Patent No.: US 9,840,616 B2
(45) Date of Patent: Dec. 12, 2017

(54) UNORIENTED FILM

(75) Inventors: Markus Gahleitner, Neuhofen/Krems (AT); Martina Sandholzer, Linz (AT); Klaus Bernreitner, Linz (AT); Pauli Leskinen, Helsinki (FI)

(73) Assignee: Borealis AG (AT)

(*) Notice: Subject to any disclaimer, the term of this patent is extended or adjusted under 35 U.S.C. 154(b) by 275 days.

(21) Appl. No.: 14/232,201

(22) PCT Filed: Jul. 10, 2012

(86) PCT No.: PCT/EP2012/063477
§ 371 (c)(1),
(2), (4) Date: Jan. 10, 2014

(87) PCT Pub. No.: WO2013/010852
PCT Pub. Date: Jan. 24, 2013

(65) Prior Publication Data
US 2014/0155547 A1     Jun. 5, 2014

(30) Foreign Application Priority Data
Jul. 15, 2011 (EP) .................................. 11174097

(51) Int. Cl.
| C08L 23/14 | (2006.01) |
| C08F 210/06 | (2006.01) |
| C08J 5/18 | (2006.01) |
| C08F 210/16 | (2006.01) |
| C08L 23/16 | (2006.01) |

(52) U.S. Cl.
CPC ............ *C08L 23/14* (2013.01); *C08F 210/06* (2013.01); *C08F 210/16* (2013.01); *C08J 5/18* (2013.01); *C08L 23/142* (2013.01); *C08J 2323/14* (2013.01); *C08J 2323/16* (2013.01); *C08L 23/16* (2013.01); *C08L 2203/16* (2013.01); *C08L 2205/02* (2013.01); *C08L 2207/02* (2013.01); *C08L 2308/00* (2013.01)

(58) Field of Classification Search
CPC ........ C08F 2/001; C08F 8/50; C08F 297/083; C08F 210/06; C08F 210/16; C08L 23/14; C08L 23/142; C08L 23/16; C08L 2205/02; C08L 2205/025; C08L 2205/03; C08L 2203/16; C08L 2207/02; C08L 2308/00; C08J 5/18; C08J 2323/14; C08J 2323/16
USPC .................................................. 525/240, 242
See application file for complete search history.

(56) References Cited

U.S. PATENT DOCUMENTS 5,298,561 A    3/1994 Cecchin et al.

FOREIGN PATENT DOCUMENTS

| EP | 0491566 A2 | 6/1992 |
| EP | 0887379 A1 | 12/1998 |
| EP | 0991719 B1 | 4/2000 |
| EP | 1681315 A1 * | 7/2006 |
| EP | 1681615 A1 | 7/2006 |
| EP | 1874838 B1 | 1/2008 |
| EP | 2014714 A1 | 1/2009 |
| EP | 2147026 B1 | 10/2010 |
| WO | 8707620 A1 | 12/1987 |
| WO | 9212182 A1 | 7/1992 |
| WO | 9219653 A1 | 11/1992 |
| WO | 9219658 A1 | 11/1992 |
| WO | 9859002 A1 | 12/1998 |
| WO | 9902604 A1 | 1/1999 |
| WO | 9924478 A1 | 5/1999 |
| WO | 9924479 A1 | 5/1999 |
| WO | 0068315 A1 | 11/2000 |
| WO | 0136502 A1 | 5/2001 |
| WO | 2004111095 A1 | 12/2001 |
| WO | 2004000899 A1 | 12/2003 |
| WO | 2006114357 A1 | 11/2006 |
| WO | 2008142019 A1 | 11/2008 |
| WO | 2011050963 A1 | 5/2011 |

OTHER PUBLICATIONS

Tetsuo Hayashi, et al. "Heptad configurational analysis of 13C n.m.r. spectra in highly isotactic polypropylene", Polymer 1988, vol. 29, January.
Richard Chujo, et al. "Two-site model analysis of 13C n.m.r. of polypropylene polymerized by Ziegler-Natta catalyst with external alkoxysilane donors" Polymer, 1994, vol. 35, No. 2.
Stavros Kromidas "Die Praxis der instrumentellen Analytik", Wiley-VCH, 1999.
Pasquini, Nello, "Polypropylene Handbook", 2nd Edition, 2005.
Extended European Search Report, dated Sep. 22, 2011.

* cited by examiner

*Primary Examiner* — Roberto Rabago
(74) *Attorney, Agent, or Firm* — Tarolli, Sundheim, Covell & Tummino LLP

(57) ABSTRACT

Unoriented film comprising at least 70 wt.-% of an heterophasic propylene copolymer, said heterophasic propylene copolymer comprises a matrix being a random propylene copolymer and an elastomeric propylene copolymer dispersed in said matrix, wherein the heterophasic propylene copolymer has (a) a melt flow rate $MFR_2$ (230° C.) in the range of 3.0 to 10.0 g/10 min, (b) a melting temperature in the range of 130 to 150° C., (c) a xylene cold soluble content in the range of 25 to 50 wt.-%, (d) comonomer content in the range of 10.0 to 15.0 wt.-%, wherein further the xylene cold soluble content of the heterophasic propylene copolymer has (e) a comonomer content in the range of 20 to 30 wt.-% and (f) an intrinsic viscosity in the range of 0.8 to below 2.0 dl/g.

14 Claims, No Drawings

UNORIENTED FILM

The present invention is directed to a new unoriented film as well as to its manufacture. The invention is further directed to the use of a heterophasic propylene copolymer to improve the optical properties of unoriented films.

Polymers are increasingly used in different demanding applications. At the same time there is a continuous seek for tailored polymers which meet the requirements of these applications. The demands can be challenging, since many polymer properties are directly or indirectly interrelated. For instance in the field of packaging soft materials having high transparency and being tough are required. Further to widen the application area of films, they must have rather low amounts of hexane extractables, so that the films can be used in the field of food and pharmaceutical packaging.

Heterophasic systems are known for its good impact behavior. Heterophasic propylene copolymers are well known in the art. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term inclusion indicates that the matrix and the inclusion form different phases within the heterophasic propylene copolymer, said inclusions are for instance visible by high resolution microscopy, like electron microscopy or scanning force microscopy.

Accordingly it is the object of the present invention to provide a soft heterophasic propylene copolymer with good impact behavior and optical properties which can be used as material for unoriented films. Another object is that the heterophasic propylene copolymer shall be applicable for the food and pharmaceutical sector.

The finding of the present invention is to provide an unoriented film comprising as a main component a heterophasic propylene copolymer, said heterophasic propylene copolymer comprises as the matrix a random propylene copolymer in which an elastomeric propylene copolymer is dispersed, the heterophasic propylene copolymer is further featured by rather low intrinsic viscosity of the xylene cold soluble fraction and a rather high overall comonomer content.

Accordingly the present invention is directed to an unoriented film comprising at least 70 wt.-% of an heterophasic propylene copolymer (RAHECO), said heterophasic propylene copolymer (RAHECO) comprises a matrix (M) being a random propylene copolymer (R-PP) and an elastomeric propylene copolymer (E) dispersed in said matrix (M), wherein the heterophasic propylene copolymer (RAHECO) has (a) a melt flow rate $MFR_2$ (230° C.) measured according to ISO 1133 in the range of 2.0 to 15.0 g/10 min,
(b) a melting temperature Tm determined by differential scanning calorimetry (DSC) in the range of 130 to 150° C.,
(c) a xylene cold soluble content (XCS) determined according ISO 16152 (25° C.) in the range of 25 to 50 wt.-%,
(d) a comonomer content in the range of 10.0 to 15.0 wt.-%, wherein further the xylene cold soluble content (XCS) of the heterophasic propylene copolymer (RAHECO) has
(e) a comonomer content in the range of 20 to 30 wt.-% and
(f) an intrinsic viscosity (IV) determined according to DIN ISO 1628/1, (in Decalin at 135° C.) in the range of 0.8 to below 2.0 dl/g.

It has surprisingly been found that such unoriented film has a low tensile modulus and high impact behavior. Also the hexane soluble content is rather low and the optical properties are very good.

In the following the invention is defined in more detail.

One distinguishes between unoriented and oriented films (see for instance polypropylene handbook, Nello Pasquini, $2^{nd}$ edition, Hanser). Oriented films are typically biaxially oriented films, whereas unoriented films are cast or blown films. Accordingly an unoriented film is not drawn intensively in machine and transverse direction as done by oriented films.

Thus the unoriented film according to this invention is not a biaxially oriented film. Preferably the unoriented film according to the instant invention is a blown film or cast film, the latter being preferred.

Preferably the unoriented film has a thickness of 5 to 2,000 μm, preferably of 10 to 1,000 μm, more preferably of 20 to 700 μm, like of 40 to 500 μm.

The instant unoriented film is especially featured by its specific optical and mechanical properties.

Accordingly it is preferred that the unoriented film has
(a) a tensile modulus in machine direction measured on a cast film with a thickness of 130 μm according to ISO 527-3 at 23° C. and a cross head speed of 1 mm/min in the range of 100 to 250 MPa, more preferably in the range of 120 to 200 MPa, and/or
(b) a relative total penetration energy (Wbreak) as determined by the "Dynatest" method according to ISO 7725-2 at 0° C. on a cast film with a thickness of 130 μm in the range of 10 to 50 J/mm, more preferably in the range of 12 to 40 J/mm.

With regard to the optical properties it is preferred that the unoriented film has
(a) a transparency of at least 90%, more preferably in the range of 90 to 99%, still more preferably in the range of 92 to 98%, and/or
(b) a haze of below 6.0%, more preferably in the range of 0.5 to 5.0%, still more preferably in the range of 1.5 to 4.5%, and/or
(c) a clarity of at least 92%, more preferably in the range of 90 to 99%, still more preferably in the range of 95 to 99%, measured on a 50 μm cast film according to ASTM D1003-00

Further the unoriented film of the instant invention is featured by its low amount of extractables. Accordingly it is preferred that the unoriented film has a hexane soluble content determined according to FDA (section 177.1520) on a 100 μm cast film of below 8.0 wt.-%, more preferably in the range of 0.5 to 8.0 wt.-%, still more preferably in the range of 3.0 to 7.5 wt.-%.

Preferably not only the unoriented film is featured by the specific values of tensile modulus, relative penetration strength (Wbreak), transparency, haze, clarity and hexane extractables, but also the heterophasic propylene copolymer (RAHECO) being part of the unoriented film when measured under the same conditions as indicated above. Accordingly the above indicated values of tensile modulus, relative penetration strength (Wbreak), transparency, haze, clarity and hexane extractables are equally applicable for the heterophasic propylene copolymer (RAHECO).

One requirement of the present invention is that the unoriented film must comprise the heterophasic propylene copolymer (RAHECO) as defined in more detail below. Accordingly the unoriented film comprises at least 70 wt.-%, preferably at least 80 wt.-%, more preferably at least 90 wt.-%, still more preferably at least 95 wt.-%, yet more preferably at least 99 wt.-%, of the heterophasic propylene copolymer (RAHECO). In one preferred embodiment the unoriented film consists of the heterophasic propylene copolymer (RAHECO).

The heterophasic propylene copolymer (RAHECO) according to this invention comprises a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term inclusion indicates that the matrix (M) and the inclusion form different phases within the heterophasic propylene copolymer (RAHECO), said inclusions are for instance visible by high resolution microscopy, like electron microscopy or scanning force microscopy.

Preferably the heterophasic propylene copolymer (RAHECO) according to this invention comprises as polymer components only the random propylene copolymer (R-PP) and the elastomeric propylene copolymer (E). In other words the heterophasic propylene copolymer (RAHECO) may contain further additives but no other polymer in an amount exceeding 5 wt.-%, more preferably exceeding 3 wt.-%, like exceeding 1 wt.-%, based on the total heterophasic propylene copolymer (RAHECO). One additional polymer which may be present in such low amounts is a polyethylene which is a by-reaction product obtained by the preparation of heterophasic propylene copolymer (RAHECO) (see in detail below). Accordingly it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

The heterophasic propylene copolymer (RAHECO) according to this invention is featured by a moderate melt flow rate. Accordingly, the heterophasic propylene copolymer (HECO) has a melt flow rate $MFR_2$ (230° C.) in the range of 2.0 to 15.0 g/10 min, preferably in the range of 2.5 to 13.0 g/10 min, more preferably in the range of 3.0 to 10.0 g/10 min.

Preferably it is desired that the heterophasic propylene copolymer (RAHECO) is thermo mechanically stable. Accordingly it is appreciated that the heterophasic propylene copolymer (RAHECO) has a melting temperature of at least 130° C., more preferably in the range of 130 to 150° C., still more preferably in the range of 130 to 148° C.

Typically the heterophasic propylene copolymer (RAHECO) has a rather low crystallization temperature, i.e. of not more than 110° C., more preferably in the range of 85 to 110° C., still more preferably in the range of 90 to 108° C.

The heterophasic propylene copolymer (RAHECO) comprises apart from propylene also comonomers. Preferably the heterophasic propylene copolymer (RAHECO) comprises apart from propylene ethylene and/or $C_4$ to $C_{12}$ α-olefins. Accordingly the term "propylene copolymer" according to this invention is understood as a polypropylene comprising, preferably consisting of, units derivable from
(a) propylene and
(b) ethylene and/or $C_4$ to $C_{12}$ α-olefins.

Thus the propylene copolymers according to this invention, i.e. the heterophasic propylene copolymer (RAHECO), the random propylene copolymers (R-PP), the first propylene copolymer fraction (R-PP1), the second propylene copolymer fraction (R-PP2), and the elastomeric propylene copolymer (E), comprise monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymers according to this invention comprise, especially consist of, monomers copolymerizable with propylene from the group consisting of ethylene, 1-butene and 1-hexene. More specifically the propylene copolymers of this invention comprise—apart from propylene—units derivable from ethylene and/or 1-butene. In a preferred embodiment the propylene copolymers according to this invention comprise units derivable from ethylene and propylene only. Still more preferably the random propylene copolymer (R-PP) as well as the elastomeric propylene copolymer (E) contain the same comonomers, like ethylene.

Accordingly, the elastomeric propylene copolymer (E) is preferably an ethylene propylene rubber (EPR), whereas the random propylene copolymer (R-PP) is a random ethylene propylene copolymer (R-PP).

Additionally it is appreciated that the heterophasic propylene copolymer (RAHECO) preferably has a rather high total comonomer content which contributes to the softness of the material. Thus it is required that the comonomer content of the heterophasic propylene copolymer (RAHECO) is at least 10 wt.-%, preferably in the range of 10.0 to 15.0 wt.-%, more preferably in the range of 10.0 to 14.0 wt.-%, yet more preferably in the range of 10.5 to 13.5 wt.-%.

The xylene cold soluble (XCS) fraction measured according to according ISO 16152 (25° C.) of the heterophasic propylene copolymer (RAHECO) is at least 25 wt.-%, preferably in the range of 25 to 50 wt.-%, more preferably in the range of 30 to 45 wt.-%, still more preferably in the range of 35 to 42.

Further it is appreciated that the xylene cold soluble (XCS) fraction of the heterophasic propylene copolymer (RAHECO) is specified by its intrinsic viscosity. A low intrinsic viscosity (IV) values reflect a low weight average molecular weight. For the present invention it is required that the xylene cold soluble fraction (XCS) of the heterophasic propylene copolymer (RAHECO) has an intrinsic viscosity (IV) measured according to ISO 1628/1 (at 135° C. in decalin) of below 2.0 dl/g, more preferably of in the range of 0.8 to below 2.0 dl/g, still more preferably in the range of 1.0 to 1.9 dl/g, still yet more preferably like in the range of 1.0 to below 1.8 dl/g, like in the range of 1.0 to below 1.7 dl/g.

Additionally it is preferred that the comonomer content, i.e. ethylene content, of the xylene cold soluble (XCS) fraction of the heterophasic propylene copolymer (RAHECO) is not more than 30.0 wt.-%, more preferably in the range of 18.0 to 30.0 wt.-%, still more preferably in the range of 20.0 to 30.0 wt.-%, yet more preferably in the range of 20.0 to 27.0 wt.-%. The comonomers present in the xylene cold soluble (XCS) fraction are those defined above for the random propylene copolymer (R-PP) and the elastomeric propylene copolymer (E), respectively. In one preferred embodiment the comonomer is ethylene only.

The heterophasic propylene copolymer (RAHECO) can be further defined by its individual components, i.e. the random propylene copolymer (R-PP) and the elastomeric propylene copolymer (E).

The random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

As mentioned above the heterophasic propylene copolymer (RAHECO) is featured by a rather high comonomer content. Accordingly the comonomer content of the random propylene copolymer (R-PP) is at least 6.0 wt.-%, more preferably in the range of 6.0 to 9.0 wt.-%, yet more preferably in the range of 6.5 to 8.0 wt.-%, still more preferably in the range of 6.8 to 7.8 wt.-%.

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

The random propylene copolymer (R-PP) preferably comprises at least two polymer fractions, like two or three polymer fraction, all of them are propylene copolymers. Even more preferred the random propylene copolymer (R-PP) comprises, preferably consists of, a first propylene copolymer fraction (R-PP1) and a second propylene copolymer fraction (R-PP2). It is preferred that the first propylene copolymer fraction (R-PP1) is the comonomer lean fraction whereas the second propylene copolymer fraction (R-PP2) is the comonomer rich fraction.

In one preferred embodiment the first propylene copolymer faction (R-PP1) has a comonomer content in the range of 1.5 to 6.0 wt.-%, preferably in the range of 2.0 to 6.0 wt.-%, still more preferably in the range of 2.0 to 5.0, like in the range of 2.0 to 4.5 wt.-%.

The second propylene copolymer fraction (R-PP2) has preferably a comonomer content in the range of 8.0 to 12 wt.-%, more preferably in the range of 9.0 to 11.0 wt.-%, like in the range of 9.5 to 10.8 wt.-%.

It is additionally appreciated that the following inequation (I), preferably inequation (Ia), is fulfilled:

$$[R\text{-}PP]-[R\text{-}PP1] \geq 2.5 \tag{I}$$

$$[R\text{-}PP]-[R\text{-}PP1] \geq 2.8 \tag{Ia}$$

wherein
[R-PP] the comonomer content [wt.-%] of the random propylene copolymer (R-PP), and
[R-PP1] the comonomer content [wt.-%] of the first propylene copolymer fraction (R-PP1), Concerning the comonomers used for the first propylene copolymer fraction (R-PP1) and second propylene copolymer fraction (R-PP2) reference is made to the comonomers of the random propylene copolymer (R-PP). Preferably the first propylene copolymer fraction (R-PP1) and the second propylene copolymer fraction (R-PP2) contain the same comonomers, like ethylene.

A further component of the heterophasic propylene copolymer (RAHECO) is the elastomeric propylene copolymer (E) dispersed in the matrix (M). Concerning the comonomers used in the elastomeric propylene copolymer (E) it is referred to the information provided for the heterophasic propylene copolymer (RAHECO). Accordingly the elastomeric propylene copolymer (E) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer (E) comprises units derivable from ethylene and propylene only.

The comonomer content of the elastomeric propylene copolymer (E) preferably is in the range of 28.0 to 40.0 wt.-%, more preferably in the range of 30.0 to 38.0 wt.-%, like in the range of 30.0 to 36.0 wt.-%.

Further, the weight ratio between the first propylene copolymer fraction (R-PP1) and second propylene copolymer fraction (R-PP2) preferably is 30:70 to 70:30, more preferably 35:65 to 65:35, still more preferably 40:60 to 60:40.

On the other hand the weight ratio between the random propylene copolymer (R-PP) and the elastomeric propylene copolymer (E) preferably is 90:10 to 70:30, more preferably 85:15 to 75:25.

The heterophasic propylene copolymer (RAHECO) as defined in the instant invention may contain up to 1.0 wt.-% additives, like nucleating agents and antioxidants, as well as slip agents and antiblocking agents.

As described in detail below the heterophasic propylene copolymer (RAHECO) is obtained by visbreaking a heterophasic propylene copolymer (Pre-RAHECO). Accordingly in the following the heterophasic propylene copolymer (Pre-RAHECO) is described in more detail.

The heterophasic propylene copolymer (Pre-RAHECO) comprises a matrix (Pre-M) being a random propylene copolymer (Pre-R-PP) and an elastomeric propylene copolymer (Pre-E) dispersed in said matrix (Pre-M). Preferably the random propylene copolymer (Pre-R-PP) comprises at least two polymer fractions, like two or three polymer fraction, all of them are propylene copolymers. Even more preferred the random propylene copolymer (Pre-R-PP) comprises, preferably consists of, a first propylene copolymer fraction (Pre-R-PP1) and a second propylene copolymer fraction (Pre-R-PP2).

Visbreaking does not alter the amount or type of comonomer. Accordingly with regard to the amounts of comonomer in the heterophasic propylene copolymer (Pre-RAHECO) and its individual fractions it is referred to the heterophasic propylene copolymer (RAHECO) and its fractions, respectively. The same applies for the comonomer types used in these fractions.

Further the heterophasic propylene copolymer (Pre-RAHECO) preferably has a melt flow rate $MFR_2$ (230° C.) measured according to ISO 1133 in the range of 0.3 to 2.5 g/10 min, more preferably in the range of 0.6 to 2.0 g/10 min. The melt flow rate $MFR_2$ (230° C.) of the heterophasic propylene copolymer (Pre-RAHECO) is lower compared to the melt flow rate $MFR_2$ (230° C.) of the (visborken) heterophasic propylene copolymer (RAHECO). Accordingly the difference between the melt flow rate $MFR_2$ (230° C.) of the (visborken) heterophasic propylene copolymer (RAHECO) and the heterophasic propylene copolymer (Pre-RAHECO) [$MFR_2$ (RAHECO)–$MFR_2$ (Pre-RAHECO)] is at least 0.5 g/10 min, more preferably at least 1.0 g/10 min, yet more preferably at least 5.0 g/10 min, still more preferably in the range of 1.0 to 15.3 g/10 min, like in the range of 2.0 to 10.0 g/10 min.

The xylene cold soluble (XCS) fraction measured according to according ISO 16152 (25° C.) of the heterophasic propylene copolymer (Pre-RAHECO) is at least 25 wt.-%, preferably in the range of 25 to 50 wt.-%, more preferably in the range of 30 to 48 wt.-%, still more preferably in the range of 38 to 45.

The xylene cold soluble fraction (XCS) of the heterophasic propylene copolymer (Pre-RAHECO) preferably has an intrinsic viscosity (IV) measured according to ISO 1628/1 (at 135° C. in decaline) of below 3.0 dl/g, more preferably of in the range of 1.4 to below 2.5 dl/g, still more preferably in the range of 1.5 to 2.3 dl/g.

As indicated above the random propylene copolymer (Pre-R-PP) comprises at least two, more preferably comprises two, yet more preferably consists of two, propylene copolymer fractions (Pre-R-PP1) and (Pre-R-PP2), the two propylene copolymer fractions (Pre-R-PP1) and (Pre-R-PP2) differ from each other by the comonomer content. Accordingly it is preferred that the first propylene copolymer fraction (Pre-R-PP1) is the comonomer lean fraction whereas the second propylene copolymer fraction (Pre-R-PP2) is the comonomer rich fraction. Concerning the preferred comonomer content in each fraction it is referred to the information provided for the first propylene copolymer fraction (R-PP1) and the second propylene copolymer fraction (R-PP2), respectively. The same applies to the weight ratio between the first propylene copolymer fraction (Pre-R-PP1) and the second propylene copolymer fraction (Pre-R-PP2). Also with regard to this requirement it is referred to the first propylene copolymer fraction (R-PP1) and the second propylene copolymer fraction (R-PP2), respectively.

Further it is preferred that the first propylene copolymer fraction (Pre-R-PP1) and the second propylene copolymer fraction (Pre-R-PP2) have nearby the same melt flow rate. Accordingly it is preferred that difference between the melt flow rate of the random propylene copolymer (Pre-R-PP) and the first propylene copolymer fraction (R-PP1) [MFR (Pre-R-PP)–MFR(Pre-R-PP1)] is below +/−1.5 g/10 min, more preferably +/−1.0 g/10 min, yet more preferably +/−0.5 g/10 min. Thus in one embodiment the first propylene copolymer fraction (R-PP1) and the second propylene copolymer fraction (Pre-R-PP2) have a melt flow rate $MFR_2$ (230° C.) in the range of 0.3 to 3.0 g/10 min, more preferably in the range of 0.6 to 2.5 g/10 min.

As mentioned above the first propylene copolymer fraction (Pre-R-PP1) is the comonomer lean fraction whereas the second propylene copolymer fraction (Pre-R-PP2) is the comonomer rich fraction. A higher comonomer content increases also the xylene soluble content. Thus the first propylene copolymer fraction (Pre-R-PP1) preferably has higher xylene cold soluble (XCS) content than the second propylene copolymer fraction (Pre-R-PP2). Consequently it is preferred that the difference between the xylene cold soluble content (XCS) (in weight percentage) of the random propylene copolymer (Pre-R-PP) and the first propylene copolymer fraction (R-PP1) [XCS (Pre-R-PP)–XCS(Pre-R-PP1)] is at least 14 wt.-%, more preferably in the range of 14 to 25 wt.-%, yet more preferably in the range of 15 to 21 wt.-%. Thus in one embodiment the first propylene copolymer fraction (R-PP1) has a xylene cold soluble content (XCS) in the range 2 to 12 wt.-%, more preferably in the range of 3 to 10 wt.-% and/or the second propylene copolymer fraction (Pre-R-PP2) has a xylene cold soluble content (XCS) in the range of 25 to 60 wt.-%, more preferably in the range of 30 to 50 wt.-/.

A further component of the heterophasic propylene copolymer (Pre-RAHECO) is the elastomeric propylene copolymer (Pre-E) dispersed in the matrix (Pre-M), i.e. in the random propylene copolymer (Pre-R-PP). Concerning the comonomers used in the elastomeric propylene copolymer (Pre-E) it is referred to the information provided for the heterophasic propylene copolymer (RAHECO) and especially for the in the elastomeric propylene copolymer (E). Accordingly any information provided regarding the comonomer content and comonomer type of the elastomeric propylene copolymer (E) can be used one-to-one for the elastomeric propylene copolymer (Pre-E).

Further, the weight ratio between the first propylene copolymer fraction (Pre-R-PP1) and second propylene copolymer fraction (Pre-R-PP2) preferably is 30:70 to 70:30, more preferably 35:65 to 65:35, still more preferably 40:60 to 60:40.

On the other hand the weight ratio between the random propylene copolymer (Pre-R-PP) and the elastomeric propylene copolymer (Pre-E) preferably is 90:10 to 70:30, more preferably 85:15 to 75:25.

Further the present invention is also directed to the use of an heterophasic propylene copolymer (RAHECO) for improving the optical properties of an unoriented film, said improvement is determined by a haze of below 6.0%, more preferably below 5.0%, yet more preferably in the range of 0.5 to 5.0%, like 1.5 to 4.5%, the haze is measured on a 50 μm cast film according to ASTM D1003-00, wherein the heterophasic propylene copolymer (RAHECO) comprises a matrix (M) being a random propylene copolymer (R-PP) and an elastomeric propylene copolymer (E) dispersed in said matrix (M), wherein further the heterophasic propylene copolymer (RAHECO) has (a) a melt flow rate $MFR_2$ (230° C.) measured according to ISO 1133 in the range of 2.0 to 15.0 g/10 min, (b) a melting temperature Tm determined by differential scanning calorimetry (DSC) in the range of 130 to 150° C., (c) a xylene cold soluble content (XCS) determined according ISO 16152 (25° C.) in the range of 25 to 50 wt.-%, (d) a comonomer content in the range of 10.0 to 15.0 wt.-%, wherein furthermore the xylene cold soluble content (XCS) of the heterophasic propylene copolymer (RAHECO) has (e) a comonomer content in the range of 20 to 30 wt.-% and (f) an intrinsic viscosity (IV) determined according to DIN ISO 1628/1, (in Decalin at 135° C.) in the range of 0.8 to below 2.0 dl/g.

Additionally or alternatively to the use discussed in the previous paragraph the present invention is also directed to the use of an heterophasic propylene copolymer (RAHECO) for lowering the extractables of an unoriented film, said lowering is determined by the hexane soluble content of below 8.0 wt.-%, more preferably of below 7.5 wt.-%, still more preferably in the range of 1.0 to 8.0 wt.-%, yet more preferably in the range of 2.0 to 7.5 wt.-%, the hexane soluble content is determined according to FDA (section 177.1520) on a 100 μm cast film, wherein the heterophasic propylene copolymer (RAHECO) comprises a matrix (M) being a random propylene copolymer (R-PP) and an elastomeric propylene copolymer (E) dispersed in said matrix (M), wherein further the heterophasic propylene copolymer (RAHECO) has (a) a melt flow rate $MFR_2$ (230° C.) measured according to ISO 1133 in the range of 2.0 to 15.0 g/10 min, (b) a melting temperature Tm determined by differential scanning calorimetry (DSC) in the range of 130 to 150° C., (c) a xylene cold soluble content (XCS) determined according ISO 16152 (25° C.) in the range of 25 to 50 wt.-%, (d) a comonomer content in the range of 10.0 to 15.0 wt.-%,
wherein furthermore the xylene cold soluble content (XCS) of the heterophasic propylene copolymer (RAHECO) has (e) a comonomer content in the range of 20 to 30 wt.-% and (f) an intrinsic viscosity (IV) determined according to DIN ISO 1628/1, (in Decalin at 135° C.) in the range of 0.8 to below 2.0 dl/g.

Further information about the heterophasic propylene copolymer (RAHECO) is provided above when discussing the unoriented film. Preferably the unoriented film is a blown film or a cast film, the latter being preferred.

The present invention is also directed to the manufacture of the instant unoriented film. Accordingly the instant invention is directed to a process for producing an unoriented film as defined above comprising the steps of (a) producing in a multistage process comprising at least two reactors connected in series a heterophasic propylene copolymer (Pre-RAHECO) comprising a matrix (Pre-M) being a random propylene copolymer (Pre-R-PP) and an elastomeric propylene copolymer (Pre-E) dispersed in said matrix (Pre-M), wherein said heterophasic propylene copolymer (Pre-RAHECO) has
  (a1) a melt flow rate $MFR_2$ (230° C.) measured according to ISO 1133 in the range of 0.3 to 2.5 g/10 min,
  (a2) a xylene cold soluble content (XCS) determined according ISO 16152 (25° C.) in the range of 25 to 50 wt.-%,
    wherein further the xylene cold soluble content (XCS) of said heterophasic propylene copolymer (Pre-RAHECO) has an intrinsic viscosity (IV) determined according to DIN ISO 1628/1, (in Decalin at 135° C.) in the range of 1.4 to below 3.0 dl/g, (b) visbreaking the heterophasic propylene copolymer (Pre-RAHECO) of step (a) obtaining a heterophasic propylene copolymer (RAHECO), said heterophasic propylene copolymer (RAHECO) has
  (b1) a melt flow rate $MFR_2$ (230° C.) measured according to ISO 1133 in the range of 2.0 to 15.0 g/10 min,
  (b2) a melting temperature Tm determined by differential scanning calorimetry (DSC) in the range of 130 to 150° C.,
  (b3) a xylene cold soluble content (XCS) determined according ISO 16152 (25° C.) in the range of 25 to 50 wt.-%,
  (b4) a comonomer content in the range of 10.0 to 15.0 wt.-%,
    wherein further the xylene cold soluble content (XCS) of the heterophasic propylene copolymer (RAHECO) of step (b) has
  (b5) a comonomer content in the range of 20 to 30 wt.-% and
  (b6) an intrinsic viscosity (IV) determined according to DIN ISO 1628/1, (in Decalin at 135° C.) in the range of 0.8 to below 2.0 dl/g, (c) extruding said heterophasic propylene copolymer (RAHECO) of step (b) into an unoriented film.

Preferably the heterophasic propylene copolymer (Pre-RAHECO) is obtained by a sequential polymerization process comprising the steps of (a) polymerizing in a first reactor propylene and ethylene and/or $C_4$ to $C_{12}$ α-olefin obtaining thereby a first propylene copolymer fraction (Pre-PP1), (b) transferring said first propylene copolymer fraction (Pre-PP1) in a second reactor, (c) polymerizing in said second reactor in the presence of the first propylene copolymer fraction (Pre-PP1) propylene and ethylene and/or $C_4$ to $C_{12}$ α-olefin obtaining a second propylene copolymer fraction (Pre-PP2), said first propylene copolymer fraction (Pre-PP1) and said second propylene copolymer fraction (Pre-PP2) form the matrix (Pre-PP), (d) transferring said matrix (Pre-M) in a third reactor, (e) polymerizing in said third reactor in the presence of the matrix (Pre-M) propylene and ethylene and/or $C_4$ to $C_{12}$ α-olefin obtaining an elastomeric propylene copolymer (E), said matrix (Pre-M) and said elastomeric propylene copolymer (E) form the heterophasic propylene copolymer (Pre-RAHECO).

For preferred embodiments of the heterophasic propylene copolymer (Pre-HECO), the random propylene copolymer (Pre-R-PP), the first propylene copolymer fraction (Pre-PP1), the second propylene copolymer fraction (Pre-R-PP2), and the elastomeric copolymer (Pre-E) reference is made to the definitions given above.

The term "sequential polymerization process" indicates that the heterophasic propylene copolymer (Pre-HECO) is produced in at least two, like three, reactors connected in series. Accordingly the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor (R3) are gas phase reactors (GPR). Accordingly for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (Pre-RAHECO) as defined above the conditions for the first reactor, i.e. the slurry reactor, like a loop reactor, may be as follows:
  the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture of the first reactor is transferred to the second reactor, i.e. gas phase reactor, where the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor is similar to the second reactor.

The residence time can vary in the three reactor zones.

In one embodiment of the process for producing the heterophasic propylene copolymer (Pre-RAHECO) the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor, i.e. in the slurry reactor, like in the loop reactor, and/or as a condensed mode in the gas phase reactors.

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (RAHECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

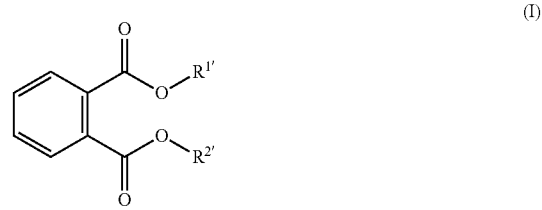

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of adding to said titanised carrier (i) a dialkylphthalate of formula (I) with $R^{1'}$ and $R^{2'}$ being independently at least a $C_5$-alkyl, like at least a $C_8$-alkyl, or preferably (ii) a dialkylphthalate of formula (I) with $R^{1'}$ and $R^{2'}$ being the same and being at least a $C_5$-alkyl, like at least a $C_8$-alkyl, or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

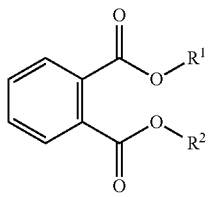

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BCF20P catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

For the production of the heterophasic propylene copolymer (Pre-RAHECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

$Si(OCH_3)_2R_2^5$     (III)

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More preferably the external donor is selected from the group consisting of diethylaminotriethoxysilane [$Si(OCH_2CH_3)_3(N(CH_2CH_3)_2)$], dicyclopentyl dimethoxy silane [$Si(OCH_3)_2(cyclo-pentyl)_2$], diisopropyl dimethoxy silane [$Si(OCH_3)_2(CH(CH_3)_2)_2$] and mixtures thereof.

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$CH_2=CH-CHR^3R^4$ wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

As already identified above, the heterophasic propylene copolymer (Pre-RAHECO) is subjected a visbreaking step (step (b)) obtaining thereby the heterophasic propylene copolymer (RAHECO). The visbreaking may be carried out in any known manner, but typically the present invention envisages chemical visbreaking using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis(tert.butylperoxy-isopropyl)benzene (DIPP) (for instance sold under the tradenames Perkadox 14S and Lupperox DC). Suitable amounts of peroxide to be employed in accordance with the present invention are in principle known to the skilled person and can easily be calculated on the basis of the amount of heterophasic propylene copolymer (Pre-RAHECO) to be subjected to visbreaking, the $MFR_2$ (230° C.) value of the polypropylene composition and/or random propylene copolymer (R-PP) to be subjected to visbreaking and the desired target $MFR_2$ (230° C.) of the product, i.e. the heterophasic propylene copolymer (RAHECO), to be obtained. Accordingly, typical amounts of peroxide visbreaking agent are from 0.005 to 0.5 wt.-%, more preferably from 0.01 to 0.2 wt.-%, based on the amount of propylene polymer employed.

Typically, visbreaking in accordance with the present invention is carried out in an extruder, so that under the suitable conditions, an increase of melt flow rate is obtained.

During visbreaking, higher molar mass chains of the starting product are broken statistically more frequently than lower molar mass molecules, resulting in an overall decrease of the average molecular weight and an increase in melt flow rate.

The additives as stated above are added prior or after visbreaking to the heterophasic propylene copolymer (Pre-RAHECO) and the heterophasic propylene copolymer (RAHECO), respectively. Preferably, these additives are mixed into the heterophasic propylene copolymer (Pre-RAHECO) prior to visbreaking. In another preferred embodiment the additives and the degarding agent (peroxide) are added in the same extrusion/mixing process, preferably into a co-rotating twin screw extruder as mentioned below.

For mixing, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then further processed, e.g. by film forming process as described below.

In case unoriented film is produced by cast film technology the molten heterophasic propylene copolymer (RAHECO) is extruded through a slot extrusion die onto a chill roll to cool the polymer to a solid film. Typically the heterophasic propylene copolymer (RAHECO) is firstly compressed and liquefied in an extruder, it being possible for any additives to be already added to the polymer or introduced at this stage via a masterbatch. The melt is then forced through a flat-film die (slot die), and the extruded film is taken off on one or more take-off rolls, during which it cools and solidifies. It has proven particularly favorable to keep the take-off roll or rolls, by means of which the extruded film is cooled and solidified, at a temperature from 10 to 50° C., preferably from 15 to 40° C.

In the blown film process the heterophasic propylene copolymer (RAHECO) melt is extruded through an annular die and blown into a tubular film by forming a bubble which is collapsed between nip rollers after solidification. The blown extrusion can be preferably effected at a temperature in the range 160 to 240° C., and cooled by water or preferably by blowing gas (generally air) at a temperature of 10 to 50° C. to provide a frost line height of 0.5 to 8 times the diameter of the die. The blow up ratio should generally be in the range of from 1.5 to 4, such as from 2 to 4, preferably 2.5 to 3.5.

Considering the above the following embodiments are of particular relevance.

Paragraph [1] Unoriented film comprising at least 70 wt.-% of an heterophasic propylene copolymer (RAHECO), said heterophasic propylene copolymer (RAHECO) comprises a matrix (M) being a random propylene copolymer (R-PP) and an elastomeric propylene copolymer (E) dispersed in said matrix (M), wherein the heterophasic propylene copolymer (RAHECO) has
(a) a melt flow rate $MFR_2$ (230° C.) measured according to ISO 1133 in the range of 2.0 to 15.0 g/10 min,
(b) a melting temperature Tm determined by differential scanning calorimetry (DSC) in the range of 130 to 150° C.,
(c) a xylene cold soluble content (XCS) determined according ISO 16152 (25° C.) in the range of 25 to 50 wt.-%,
(d) a comonomer content in the range of 10.0 to 15.0 wt.-%, wherein further the xylene cold soluble content (XCS) of the heterophasic propylene copolymer (RAHECO) has
(e) a comonomer content in the range of 20 to 30 wt.-% and
(f) an intrinsic viscosity (IV) determined according to DIN ISO 1628/1, (in Decalin at 135° C.) in the range of 0.8 to below 2.0 dl/g.

Paragraph [2] Unoriented film according to paragraph [1], wherein the random propylene copolymer (R-PP) has a comonomer content in the range of 6.0 to 9.0 wt.-%.

Paragraph [3] Unoriented film according to paragraph [2], wherein the random propylene copolymer (R-PP) comprises at least two propylene copolymer fractions (R-PP1) and (R-PP2), wherein the first propylene copolymer faction (R-PP1) has a comonomer content in the range of 2.0 to 6.0 wt.-%, wherein optionally further
(a) the second propylene copolymer fraction (R-PP2) has a higher comonomer content than the first propylene copolymer faction (R-PP1) and/or
(b) [R-PP]−[R-PP1]≥2.5
   wherein
   [R-PP] the comonomer content [wt.-%] of the random propylene copolymer (R-PP), and
   [R-PP1] the comonomer content [wt.-%] of the first propylene copolymer fraction (R-PP 1), and/or
(c) the second propylene copolymer fraction (R-PP2) has a comonomer content in the range of 8.0 to 12.0 wt-%.

Paragraph [4] Unoriented film according to one of the paragraphs [1] to [3], wherein the comonomers of the random propylene copolymer (R-PP), the first propylene copolymer fraction (R-PP1) and the second propylene copolymer fraction (R-PP2) are ethylene and/or $C_4$ to $C_{12}$ α-olefin.

Paragraph [5] Unoriented film according to one of the paragraphs [1] to [4], wherein said film has
(a) a tensile modulus in machine direction measured on a cast film with a thickness of 130 μm according to ISO 527-3 at 23° C. and a cross head speed of 1 mm/min in the range of 100 to 250 MPa, and/or
(b) a relative total penetration energy (Wbreak) as determined by the "Dynatest" method according to ISO 7725-2 at 0° C. on a cast film with a thickness of 130 μm in the range of 10 to 50 J/mm.

Paragraph [6] Unoriented film according to one of the paragraphs [1] to [5], wherein said film has
(a) a transparency of at least 90%, and/or
(b) a haze of below 6.0%, and/or
(c) a clarity of at least 92%,
measured on a 50 μm cast film according to ASTM D1003-00.

Paragraph [7] Unoriented film according to one of the paragraphs [1] to [6], wherein said film has a hexane soluble content determined according to FDA (section 177.1520) on a 100 μm cast film of below 8.0 wt.-%.

Paragraph [8] Unoriented film according to one of the paragraphs [1] to [7], wherein the heterophasic propylene copolymer (RAHECO) has been visbroken.

Paragraph [9] Unoriented film according to one of the paragraphs [1] to [8], wherein the heterophasic propylene copolymer (RAHECO) prior to visbreaking is a heterophasic propylene copolymer (Pre-RAHECO) comprising a matrix (Pre-M) being a random propylene copolymer (Pre-R-PP) and an elastomeric propylene copolymer (Pre-E) dispersed in said matrix (Pre-M), said heterophasic propylene copolymer (Pre-RAHECO) has
(a) a melt flow rate $MFR_2$ (230° C.) measured according to ISO 1133 in the range of 0.3 to 2.5 g/10 min,
(b) a xylene cold soluble content (XCS) determined according ISO 16152 (25° C.) in the range of 25 to 50 wt.-%, wherein further the xylene cold soluble content (XCS) of the heterophasic propylene copolymer (Pre-RAHECO) prior to visbreaking has an intrinsic viscosity (IV) determined according to DIN ISO 1628/1, (in Decalin at 135° C.) in the range of 1.4 to below 2.5 dl/g.

Paragraph [10] Unoriented film according to one of the paragraphs [1] to [9],
wherein the unoriented film is a cast film or a blown film.

Paragraph [11] Process for producing an unoriented film according to one of the
paragraphs [1] to [10] comprising the steps of
(a) producing in a multistage process comprising at least two reactors connected in series a heterophasic propylene copolymer (Pre-RAHECO) comprising a matrix (Pre-M) being a random propylene copolymer (Pre-R-PP) and an elastomeric propylene copolymer (Pre-E) dispersed in said matrix (Pre-M), wherein said heterophasic propylene copolymer (Pre-RAHECO) has
   (a1) a melt flow rate $MFR_2$ (230° C.) measured according to ISO 1133 in the range of 0.3 to 2.5 g/10 min,
   (a2) a xylene cold soluble content (XCS) determined according ISO 16152 (25° C.) in the range of 25 to 50 wt.-%,
   wherein further the xylene cold soluble content (XCS) of said heterophasic propylene copolymer (Pre-RAHECO) has an intrinsic viscosity (IV) determined according to DIN ISO 1628/1, (in Decalin at 135° C.) in the range of 1.4 to below 2.5 dl/g,
(b) visbreaking the heterophasic propylene copolymer (Pre-RAHECO) of step (a) obtaining a heterophasic propylene copolymer (RAHECO), said heterophasic propylene copolymer (RAHECO) has
   (b1) a melt flow rate $MFR_2$ (230° C.) measured according to ISO 1133 in the range of 2.0 to 15.0 g/10 min,
   (b2) a melting temperature Tm determined by differential scanning calorimetry (DSC) in the range of 130 to 150° C.,
   (b3) a xylene cold soluble content (XCS) determined according ISO 16152 (25° C.) in the range of 25 to 50 wt.-%,
   (b4) a comonomer content in the range of 10.0 to 15.0 wt.-%,
   wherein further the xylene cold soluble content (XCS) of the heterophasic propylene copolymer (RAHECO) of step (b) has
   (b5) a comonomer content in the range of 20 to 30 wt.-% and
   (b6) an intrinsic viscosity (IV) determined according to DIN ISO 1628/1, (in Decalin at 135° C.) in the range of 0.8 to below 2.0 dl/g,
(c) extruding said heterophasic propylene copolymer (RAHECO) of step (b) into a unoriented film.

Paragraph [12] Process according to paragraph [11], wherein
(a) in a first reactor propylene and ethylene and/or $C_4$ to $C_{12}$ α-olefin are polymerized obtaining a first propylene copolymer fraction (Pre-PP1),
(b) transferring said first propylene copolymer fraction (Pre-PP1) in a second reactor,
(c) polymerizing in said second reactor in the presence of the first propylene copolymer fraction (Pre-PP1) propylene and ethylene and/or $C_4$ to $C_{12}$ α-olefin obtaining a second propylene copolymer fraction (Pre-PP2), said first propylene copolymer fraction (Pre-PP1) and said second propylene copolymer fraction (Pre-PP2) form the matrix (Pre-PP),
(d) transferring said matrix (Pre-M) in a third reactor,
(e) polymerizing in said third reactor in the presence of the matrix (Pre-M) propylene and ethylene and/or $C_4$ to $C_{12}$ α-olefin obtaining an elastomeric propylene copolymer (E), said matrix (Pre-M) and said elastomeric propylene copolymer (E) form the heterophasic propylene copolymer (Pre-RAHECO).

Paragraph [13] Process according to paragraph [11] or [12], wherein unoriented film and/or the heterophasic propylene copolymer (RAHECO) is further defined according one of the preceding claims 1 to 7 and 10.

Paragraph [14] Use of an heterophasic propylene copolymer (RAHECO) for improving the optical properties of an unoriented film, said improvement is determined by a haze of below 6.0%, the haze is measured on a 50 μm cast film according to ASTM D1003-00, wherein the heterophasic propylene copolymer (RAHECO) comprises a matrix (M) being a random propylene copolymer (R-PP) and an elastomeric propylene copolymer (E) dispersed in said matrix (M),
wherein further the heterophasic propylene copolymer (RAHECO) has
(a) a melt flow rate $MFR_2$ (230° C.) measured according to ISO 1133 in the range of 2.0 to 15.0 g/10 min,
(b) a melting temperature Tm determined by differential scanning calorimetry (DSC) in the range of 130 to 150° C.,
(c) a xylene cold soluble content (XCS) determined according ISO 16152 (25° C.) in the range of 25 to 50 wt.-%,
(d) a comonomer content in the range of 10.0 to 15.0 wt.-%,
wherein furthermore the xylene cold soluble content (XCS) of the heterophasic propylene copolymer (RAHECO) has
(e) a comonomer content in the range of 20 to 30 wt.-% and
(f) an intrinsic viscosity (IV) determined according to DIN ISO 1628/1, (in Decalin at 135° C.) in the range of 0.8 to below 2.0 dl/g.

Paragraph [15] Use according to paragraph [14], wherein the heterophasic propylene copolymer (RAHECO) is further defined according to one of the paragraphs [1] to [4], [8] and [9].

Paragraph [16] Use according to claim paragraph [14] or [15], wherein the unoriented film is a cast film or a blown film.

In the following the present invention is further illustrated by means of examples.

EXAMPLES

1. Measuring Methods

The following definitions of terms and determination methods apply for the above general description of the invention as well as to the below examples unless otherwise defined.

Calculation of comonomer content of the second propylene copolymer fraction (R-PP2) and (Pre-R-PP2), respectively:

$$\frac{C(PP) - w(PP1) \times C(PP1)}{w(PP2)} = C(PP2) \quad (I)$$

wherein
w(PP1) is the weight fraction [in wt.-%] of the first propylene copolymer fraction (R-PP1) and (Pre-R-PP1), respectively, w(PP2) is the weight fraction [in wt.-%] of second propylene copolymer fraction (R-PP2) and (Pre-R-PP2), respectively,
C(PP1) is the comonomer content [in wt.-%] of the first propylene copolymer fraction (R-PP 1) and (Pre-R-PP 1), respectively,
C(PP) is the comonomer content [in wt.-%] of the random propylene copolymer (R-PP) and (Pre-R-PP),
C(PP2) is the calculated comonomer content [in wt.-%] of the second propylene copolymer fraction (R-PP2) and (Pre-R-PP2), respectively.

Calculation of the xylene cold soluble (XCS) content of the second propylene copolymer fraction (R-PP2) and (Pre-R-PP2), respectively:

$$\frac{XS(PP) - w(PP1) \times XS(PP1)}{w(PP2)} = XS(PP2) \quad (II)$$

wherein
w(PP1) is the weight fraction [in wt.-%] of the first propylene copolymer fraction (R-PP1) and (Pre-R-PP1), respectively,
w(PP2) is the weight fraction [in wt.-%] of second propylene copolymer fraction (R-PP2) and (Pre-R-PP2), respectively,
XS(PP1) is the xylene cold soluble (XCS) content [in wt.-%] of the first propylene copolymer fraction (R-PP1) and (Pre-R-PP1), respectively,
XS(PP) is the xylene cold soluble (XCS) content [in wt.-%] of the random propylene copolymer (R-PP) and (Pre-R-PP),
XS(PP2) is the calculated xylene cold soluble (XCS) content [in wt.-%] of the second propylene copolymer fraction (R-PP2) and (Pre-R-PP2), respectively.

Calculation of melt flow rate $MFR_2$ (230° C.) of the second propylene copolymer fraction (R-PP2) and (Pre-R-PP2), respectively:

$$MFR(PP2) = 10^{\left[\frac{\log(MFR(PP)) - w(PP1) \times \log(MFR(PP1))}{w(PP2)}\right]} \quad (I)$$

wherein
w(PP1) is the weight fraction [in wt.-%] of the first propylene copolymer fraction (R-PP1) and (Pre-R-PP1), respectively,
w(PP2) is the weight fraction [in wt.-%] of second propylene copolymer fraction (R-PP2) and (Pre-R-PP2), respectively,
MFR(PP1) is the melt flow rate $MFR_2$ (230° C.) [in g/10 min] of the first propylene copolymer fraction (R-PP1) and (Pre-R-PP1), respectively,
MFR(PP) is the melt flow rate $MFR_2$ (230° C.) [in g/10 min] of the random propylene copolymer (R-PP) and (Pre-R-PP),
MFR(PP2) is the calculated melt flow rate $MFR_2$ (230° C.) [in g/10 min] of the second propylene copolymer fraction (R-PP2) and (Pre-R-PP2), respectively.

Calculation of comonomer content of the elastomeric propylene copolymer (E) and (Pre-E), respectively:

$$\frac{C(RAHECO) - w(PP) \times C(PP)}{w(E)} = C(E) \quad (IV)$$

wherein
w(PP) is the weight fraction [in wt.-%] of the random propylene copolymer (R-PP) and (Pre-R-PP),
w(E) is the weight fraction [in wt.-%] of the elastomeric propylene copolymer (E) and (Pre-E), respectively,
C(PP) is the comonomer content [in wt.-%] of the random propylene copolymer (R-PP) and (Pre-R-PP),
C(RAHECO) is the comonomer content [in wt.-%] of the heterophasic propylene copolymer (RAHECO)
C(E) is the calculated comonomer content [in wt.-%] of elastomeric propylene copolymer (E) and (Pre-E), respectively.

Calculation of xylene cold soluble (XCS) content of the third polypropylene (PP3):

$$\frac{XS(RAHECO) - w(PP) \times XS(PP)}{w(E)} = XS(E) \quad (V)$$

wherein
w(PP) is the weight fraction [in wt.-%] of the random propylene copolymer (R-PP) and (Pre-R-PP),
w(E) is the weight fraction [in wt.-%] of the elastomeric propylene copolymer (E) and (Pre-E), respectively,
XS(PP) is the xylene cold soluble (XCS) content [in wt.-%] of the random propylene copolymer (R-PP) and (Pre-R-PP),
XS(RAHECO) is the xylene cold soluble (XCS) content [in wt.-%] of the heterophasic propylene copolymer (RAHECO)
XS(E) is the calculated xylene cold soluble (XCS) content [in wt.-%] of elastomeric propylene copolymer (E) and (Pre-E), respectively.

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chūjō, and T. Asakura, Polymer 29 138-43 (1988). and Chujo R, et al, Polymer 35 339 (1994).

The NMR-measurement was used for determining the mmmm pentad concentration in a manner well known in the art.

Number average molecular weight ($M_n$), weight average molecular weight ($M_w$) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

$MFR_2$ (230° C.) is measured according to ISO 1133 (230° C., 2.16 kg load).

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152/2005.

The hexane extractable fraction is determined according to FDA method (federal registration, title 21, Chapter 1, part 177, section 1520, s. Annex B) oncast films of 100 μm thickness produced on a monolayer cast film line with a melt temperature of 220° C. and a chill roll temperature of 20° C. The extraction was performed at a temperature of 50° C. and an extraction time of 30 min.

Comonomer content, especially ethylene content is measured with Fourier transform infrared spectroscopy (FTIR) calibrated with $^{13}$C-NMR. When measuring the ethylene content in polypropylene, a thin film of the sample (thickness about 250 μm) was prepared by hot-pressing. The area of absorption peaks 720 and 733 $cm^{-1}$ for propylene-ethylene-copolymers was measured with Perkin Elmer FTIR 1600 spectrometer. Propylene-1-butene-copolymers were evaluated at 767 $cm^{-1}$. The method was calibrated by ethylene content data measured by $^{13}$C-NMR. See also "IR-Spektroskopie für Anwender"; WILEY-VCH, 1997 and "Validierung in der Analytik", WILEY-VCH, 1997

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step Transparency, haze and clarity were determined according to ASTM D1003-00 on 60×60×1 $mm^3$ plaques injection molded in line with EN ISO 1873-2 using a melt temperature of 200° C. and on cast films of 50 μm thickness produced on a monolayer cast film line with a melt temperature of 220° C. and a chill roll temperature of 20° C.

Flexural Modulus: The flexural modulus was determined in 3-point-bending according to ISO 178 on 80×10×4 $mm^3$ test bars injection molded at 23° C. in line with EN ISO 1873-2.

Charpy notched impact strength is determined according to ISO 179 2C/DIN 53453/1eA at 23°, and at −20° C. by using an 80×10×4 $mm^3$ test bars injection molded in line with EN ISO 1873-2.

Tensile moduli in machine and transverse direction were determined according to ISO 527-3 at 23° C. on 130 μm cast films produced on a monolayer cast film line with a melt temperature of 220° C. and a chill roll temperature of 20° C. Testing was performed at a cross head speed of 1 mm/min.

Relative Total Penetration Energy:

The impact strength of films is determined by the "Dynatest" method according to ISO 7725-2 at 0° C. on cast films with a thickness of 130 μm produced on a monolayer cast film line with a melt temperature of 220° C. and a chill roll temperature of 20° C. The value "Wbreak" [J/mm] represents the relative total penetration energy per mm thickness that a film can absorb before it breaks divided by the film thickness. The higher this value, the tougher the material is.

2. Examples

The catalyst used in the polymerization process for inventive examples 1 and 2 was the commercial BCF20P catalyst (1.9 wt % Ti-Ziegler-Natta-catalyst as described in EP 591 224) of Borealis AG with triethyl-aluminium (TEA) as co-catalyst and dicyclo pentyl dimethoxy silane as donor. The aluminium to donor ratio is indicated in table 1.

The resulting polymers were visbroken in a co-rotating twin-screw extruder (type: Coperion ZSK 57) with suitable amounts of 2,5-dimethyl-2,5-di-(tert.butylperoxy)hexane (Trigonox® 101 supplied by AKZO Nobel, Netherlands). As additives 0.05 wt. % calcium stearate (Calcium stearate SP supplied by Faci, Italy) and 0.10 wt % Irganox B 215 (1:2-blend of Irganox 1010 (Pentaerythrityl-tetrakis(3-(3',5'-di-tert.butyl-4-hydroxytoluyl)-propionate and tris(2,4-di-t-butylphenyl) phosphate) phosphite) of BASF AG, Germany were added to the polymers in the same step.

Comparative example 1 is the commercial grade Borsoft SD233CF produced by Borealis being an ethylene-propylene random-heterophasic copolymer for cast film applications.

TABLE 1

| Process conditions | | IE 1 | IE 2 | CE 1 |
|---|---|---|---|---|
| Al/donor ratio | [mol/mol] | 10 | 13.9 | |
| Loop | | | | |
| H2/C3 ratio | [mol/kmol] | 0.98 | 1.46 | |
| C2/C3 ratio | [mol/kmol] | 4.4 | 8.9 | |
| $MFR_2$ | [g/10 min] | 1.25 | 1.3 | 8.0 |
| XCS | [wt.-%] | 4.1 | 8.2 | n.d. |
| C2 | [wt.-%] | 2.1 | 4.5 | 2.5 |
| GPR 1 | | | | |
| H2/C3 ratio | [mol/kmol] | 14.1 | 22 | |
| $MFR_2$ of GPR 1 | [g/10 min] | 1.5 | 2.1 | 8.0 |
| $MFR_2$ total | $MFR_2$ | 1.3 | 1.75 | 8.0 |
| XCS of GPR 1 | [wt.-%] | 38 | 46 | n.d. |
| XCS | [wt.-%] | 26.5 | 27.9 | |
| C2 of GPR 1 | [wt.-%] | 10.5 | 9.8 | 5.0 |
| C2 total | [wt.-%] | 7.1 | 7.3 | 4.0 |
| GPR 2 | | | | |
| C2/C3 ratio | [mol/kmol] | 467 | 439 | |
| H2/C2 ratio | [mol/kmol] | 250 | 250 | |
| $MFR_2$ of GPR 2 | [g/10 min] | 1.6 | 1.9 | 3.5 |
| $MFR_2$ | [g/10 min] | 1.3 | 1.6 | 7 |
| XCS of GPR 2 | [wt.-%] | 100 | 100 | n.d. |
| XCS | [wt.-%] | 41.7 | 42.1 | |
| C2 of XCS | [wt.-%] | 21.6 | 24.5 | |
| IV of XCS | [dl/g] | 1.9 | 1.6 | |
| C2 of GPR 2 | [wt.-%] | 32.1 | 35.4 | 30.7 |
| C2 content | [wt.-%] | 12.1 | 12.9 | 8.0 |
| Split Loop/GPR 1/GPR 2 | [wt.-%] | 32/48/20 | 38/43/20 | 34/51/15 |
| $MFR_2$ after visbreaking | [g/10 min] | 7.4 | 9.7 | 7.5 |

TABLE 2

| Properties | | IE 1 | IE 2 | CE 1 |
|---|---|---|---|---|
| Tm | [° C.] | 142 | 133 | 139 |
| Hm | [J/g] | 60.8 | 63.8 | 72.0 |
| Tc | [° C.] | 102 | 94 | 98.9 |
| Hc | [J/g] | 54.7 | 56.1 | 60.9 |
| C2 tot | [wt.-%] | 11.7 | 11.8 | 8.5 |

TABLE 2-continued

| Properties | | IE 1 | IE 2 | CE 1 |
|---|---|---|---|---|
| XCS/wt % | [wt.-%] | 39.7 | 37.0 | 20.9 |
| IV of XCS | [dl/g] | 1.64 | 1.07 | 1.5 |
| C2 of XCS | [wt.-%] | 23.4 | 25.7 | 28.3 |
| C6 (FDA). 100 µm CF | [wt.-%] | 6.9 | 5.0 | 3.5 |
| Flex. Mod. 23° C. | [MPa] | 259 | 239 | 480 |
| Charpy NIS. 23° C. | [kJ/m²] | 77.3 | 76.46 | 12.8 |
| Charpy NIS. −20° C. | [kJ/m²] | 2.12 | 2.09 | 1.6 |
| Haze (IM) | [%] | 40 | 45 | 69 |
| Transparency (IM) | [%] | 82 | 82 | 83 |
| Clarity (IM) | [%] | 97 | 97 | 93 |
| Haze (film) | [%] | 4.0 | 3.6 | 3.8 |
| Transparency (film) | [%] | 94 | 94 | 93 |
| Clarity (film) | [%] | 97 | 94 | 93 |
| Tens. Mod. (film, MD). 23° C. | [MPa] | 179 | 171 | 320 |
| Tens. Mod. (film, TD). 23° C. | [MPa] | 151 | 148 | 270 |
| Wbreak (Dynatest) 0° C. | [J/mm] | 17 | 15 | 15 |

The invention claimed is:

1. Unoriented film comprising at least 70 wt.% of an heterophasic propylene copolymer (RAHECO), said heterophasic propylene copolymer (RAHECO) comprises a matrix (M) being a random propylene copolymer (R-PP) and an elastomeric propylene copolymer (E) dispersed in said matrix (M), wherein the heterophasic propylene copolymer (RAHECO) has:
   (a) a melt flow rate $MFR_2$ (230° C.) measured according to ISO 1133 in the range of 3.0 to 10.0 g/10 min,
   (b) a melting temperature Tm determined by differential scanning calorimetry (DSC) in the range of 130 to 150° C.,
   (c) a xylene cold soluble content (XCS) determined according ISO 16152 (25° C.) in the range of 25 to 50 wt. %,
   (d) a comonomer content in the range of 10.0 to 13.5 wt. %,
   wherein the xylene cold soluble content (XCS) of the heterophasic propylene copolymer (RAHECO) has:
   (e) a comonomer content in the range of 21.6 to 30 wt.% and
   (f) an intrinsic viscosity (IV) determined according to DIN ISO 1628/1, (in Decalin at 135 ° C.) in the range of 0.8 to below 2.0 dl/g, and
   wherein the random propylene copolymer (R-PP):
   (g) has a comonomer content in the range of 7.1 to 9.0 wt.%, and
   (h) comprises at least two propylene copolymer fractions (R-PP1) and (R-PP2), wherein the first propylene copolymer fraction (R-PP1) has a comonomer content in the range of 2.0 to 6.0 wt %, and the second propylene copolymer fraction (R-PP2) has a comonomer content in the range of 8.0 to 11.0 wt.%,
   wherein the comonomer content of the elastomeric propylene copolymer (E) is in the range of 30.0 to 36.0 wt. %, and
   wherein said film has a thickness of 5 to 2,000 µm.

2. Unoriented film according to claim 1, wherein [R-PP]−[R-PP1]≥2.5, wherein
   [R-PP] is the comonomer content [wt. %] of the random propylene copolymer (R-PP), and [R-PP1] is the comonomer content [wt. %] of the first propylene copolymer fraction (R-PP1).

3. Unoriented film according to claim 1, wherein the comonomers of the random propylene copolymer (R-PP), the first propylene copolymer fraction (R-PP1) and the second propylene copolymer fraction (R-PP2) are ethylene and/or $C_4$ to $C_{12}$ α-olefin.

4. Unoriented film according to claim 1, wherein said film has:
   (a) a tensile modulus in machine direction measured on a cast film with a thickness of 130 µm according to ISO 527-3 at 23° C. and a cross head speed of 1 mm/min in the range of 100 to 250 MPa, and/or
   (b) a relative total penetration energy (Wbreak) as determined by the "Dynatest" method according to ISO 7725-2 at 0° C. on a cast film with a thickness of 130 µm in the range of 10 to 50 J/mm.

5. Unoriented film according to claim 1, wherein said film has:
   (a) a transparency of at least 90%,
   (b) a haze of below 6.0%, and/or
   (c) a clarity of at least 92%, measured on a 50 µm cast film according to ASTM D1003-00.

6. Unoriented film according to claim 1, wherein said film has a hexane soluble content determined according to FDA (section 177.1520) on a 100 µm cast film of below 8.0 wt. %.

7. Unoriented film according to claim 1, wherein the heterophasic propylene copolymer (RAHECO) has been visbroken.

8. Unoriented film according to claim 7, wherein the heterophasic propylene copolymer (RAHECO) prior to visbreaking is a heterophasic propylene copolymer (Pre-RAHECO) comprising a matrix (Pre-M) being a random propylene copolymer (Pre-R-PP) and an elastomeric copolymer (Pre-E) dispersed in said matrix (Pre-M), said heterophasic propylene copolymer (Pre-RAHECO) has:
   (a) a melt flow rate $MFR_2$ (230° C.) measured according to ISO 1133 in the range of 0.3 to 2.5 g/10 min, and
   (b) a xylene cold soluble content (XCS) determined according ISO 16152 (25° C.) in the range of 25 to 50 wt. %,
   wherein further the xylene cold soluble content (XCS) of the heterophasic propylene copolymer (Pre-RAHECO) prior to visbreaking has an intrinsic viscosity (IV) determined according to DIN ISO 1628/1, (in Decalin at 135° C.) in the range of 1.4 to below 2.5 dl/g.

9. Unoriented film according to claim 1, wherein the unoriented film is a cast film or a blown film.

10. Process for producing an unoriented film according to claim 1, comprising the steps of:
    (a) producing in a multistage process comprising at least two reactors connected in series a heterophasic propylene copolymer (Pre-RAHECO) comprising a matrix (Pre-M) being a random propylene copolymer (Pre-R-PP) and an elastomeric propylene copolymer (Pre-E) dispersed in said matrix (Pre-M), wherein said heterophasic propylene copolymer (Pre-RAHECO) has:
       (a1) a melt flow rate $MFR_2$ (230° C.) measured according to ISO 1133 in the range of 0.3 to 2.5 g/10 min, and
       (a2) a xylene cold soluble content (XCS) determined according ISO 16152 (25° C.) in the range of 25 to 50 wt. %,
    wherein further the xylene cold soluble content (XCS) of said heterophasic propylene copolymer (Pre-RAHECO) has an intrinsic viscosity (IV) determined according to DIN ISO 1628/1, (in Decalin at 135° C.) in the range of 1.4 to below 2.5 dl/g,
    (b) visbreaking the heterophasic propylene copolymer (Pre-RAHECO) of step (a) obtaining a heterophasic propylene copolymer (RAHECO), said heterophasic propylene copolymer (RAHECO) has:
- (b1) a melt flow rate $MFR_2$ (230° C.) measured according to ISO 1133 in the range of 3.0 to 10.0 g/10 min,
- (b2) a melting temperature Tm determined by differential scanning calorimetry (DSC) in the range of 130 to 150° C.,
- (b3) a xylene cold soluble content (XCS) determined according ISO 16152 (25° C.) in the range of 25 to 50 wt. %, and
- (b4) a comonomer content in the range of 10.0 to 13.5 wt. %, wherein the xylene cold soluble content (XCS) of the heterophasic propylene copolymer (RAHECO) of step (b) has:
- (b5) a comonomer content in the range of 21.6 to 30 wt.% and
- (b6) an intrinsic viscosity (IV) determined according to DIN ISO 1628/1, (in Decalin at 135° C.) in the range of 0.8 to below 2.0 dl/g, wherein the random propylene copolymer (R-PP):
- (b7) has a comonomer content in the range of 7.1 to 9.0 wt.%, and
- (b8) comprises at least two propylene copolymer fractions (R-PP1) and (R-PP2), wherein the first propylene copolymer fraction (R-PP1) has a comonomer content in the range of 2.0 to 6.0 wt %, and the second propylene copolymer fraction (R-PP2) has a comonomer content in the range of 8.0 to 11.0 wt. % and wherein the comonomer content of the elastomeric propylene copolymer (E) is in the range of 30.0 to 36.0 wt. %; and
- (c) extruding said heterophasic propylene copolymer (RAHECO) of step (b) into a unoriented film.

11. Process according to claim 10, wherein:
- (a) in a first reactor propylene and ethylene and/or $C_4$ to $C_{12}$ α-olefin are polymerized obtaining a first propylene copolymer fraction (Pre-PP1),
- (b) transferring said first propylene copolymer fraction (Pre-PP1) in a second reactor,
- (c) polymerizing in said second reactor in the presence of the first propylene copolymer fraction (Pre-PP1) propylene and ethylene and/or $C_4$ to $C_{12}$ α-olefin obtaining a second propylene copolymer fraction (Pre-PP2), said first propylene copolymer fraction (Pre-PP1) and said second propylene copolymer fraction (Pre-PP2) form the matrix (Pre-PP),
- (d) transferring said matrix (Pre-M) in a third reactor, and
- (e) polymerizing in said third reactor in the presence of the matrix (Pre-M) propylene and ethylene and/or $C_4$ to $C_{12}$ α-olefin obtaining an elastomeric propylene copolymer (E), said matrix (Pre-M) and said elastomeric propylene copolymer (E) form the heterophasic propylene copolymer (Pre-RAHECO).

12. Process according to claim 11, wherein unoriented film and/or the heterophasic propylene copolymer (RAHECO) has:
- (a) a melt flow rate MFR2 (230° C.) measured according to ISO 1133 in the range of 3.0 to 10.0 g/10 min,
- (b) a melting temperature Tm determined by differential scanning calorimetry (DSC) in the range of 130 to 150° C.,
- (c) a xylene cold soluble content (XCS) determined according ISO 16152 (25° C.) in the range of 25 to 50 wt. %,
- (d) a comonomer content in the range of 10.0 to 13.5 wt. %, wherein the xylene cold soluble content (XCS) of the heterophasic propylene copolymer (RAHECO) has:
- (e) a comonomer content in the range of 21.6 to 30 wt. % and
- (f) an intrinsic viscosity (IV) determined according to DIN ISO 1628/1, (in Decalin at 135° C.) in the range of 0.8 to below 2.0 dl/g.

13. A heterophasic propylene copolymer (RAHECO) for improving the optical properties of an unoriented film, comprising a matrix (M) being a random propylene copolymer (R-PP) and an elastomeric propylene copolymer (E) dispersed in said matrix (M), wherein further the heterophasic propylene copolymer (RAHECO) has
- (a) a melt flow rate $MFR_2$ (230° C.) measured according to ISO 1133 in the range of 3.0 to 10.0 g/10 min,
- (b) a melting temperature Tm determined by differential scanning calorimetry (DSC) in the range of 130 to 150° C.,
- (c) a xylene cold soluble content (XCS) determined according ISO 16152 (25° C.) in the range of 25 to 50 wt. %,
- (d) a comonomer content in the range of 10.0 to 13.5 wt. %, wherein the xylene cold soluble content (XCS) of the heterophasic propylene copolymer (RAHECO) has
- (e) a comonomer content in the range of 21.6 to 30 wt. % and
- (f) an intrinsic viscosity (IV) determined according to DIN ISO 1628/1, (in Decalin at 135° C.) in the range of 0.8 to below 2.0 dl/g, wherein the random propylene copolymer (R-PP)
- (g) has a comonomer content in the range of 7.1 to 9.0 wt. % and
- (h) comprises at least two propylene copolymer fractions (R-PP1) and (R-PP2), wherein the first propylene copolymer fraction (R-PP1) has a comonomer content in the range of 2.0 to 6.0 wt %, and the second propylene copolymer fraction (R-PP2) has a comonomer content in the range of 8.0 to 11.0 wt. %, wherein the comonomer content of the elastomeric propylene copolymer (E) is in the range of 30.0 to 36.0 wt. %; and wherein said improvement is determined by a haze of below 6.0%, wherein said film has a thickness of 5 to 2,000 μm and the haze is measured on a 50 μm cast film according to ASTM D1003-00.

14. The heterophasic propylene copolymer (RAHECO) according to claim 13, wherein the unoriented film is a cast film or a blown film.

* * * * *